(12) United States Patent
Kreuter

(10) Patent No.: US 6,273,116 B1
(45) Date of Patent: Aug. 14, 2001

(54) METHOD AND DEVICE FOR OPENING A VALVE, ESPECIALLY A LOAD CHANGING VALVE OF AN INTERNAL COMBUSTION ENGINE

(75) Inventor: Peter Kreuter, Aachen (DE)

(73) Assignee: META Motoren- und Energie-Technik GmbH, Herzogenrath (DE)

( * ) Notice: Subject to any disclaimer, the term of this patent is extended or adjusted under 35 U.S.C. 154(b) by 0 days.

(21) Appl. No.: 09/368,659

(22) Filed: Aug. 5, 1999

(30) Foreign Application Priority Data

Aug. 5, 1998 (DE) ................................ 198 35 403

(51) Int. Cl.$^7$ ................................ F16K 47/00
(52) U.S. Cl. ................ 137/1; 137/469; 137/484.8
(58) Field of Search ................ 137/1, 2, 469, 137/484.8; 251/282

(56) References Cited

U.S. PATENT DOCUMENTS

| | | | | |
|---|---|---|---|---|
| 1,664,375 | * | 3/1928 | Howard | 251/282 X |
| 1,720,705 | * | 7/1929 | Waterman | 251/282 X |
| 2,627,418 | * | 2/1953 | Ainsworth | 251/282 X |
| 2,980,139 | * | 4/1961 | Lynn | 251/282 X |

\* cited by examiner

*Primary Examiner*—Stephen M. Hepperle
(74) *Attorney, Agent, or Firm*—Robert W. Becker & Associates; Robert W. Becker

(57) ABSTRACT

In a method for opening a valve, which valve separates a flow channel from a working chamber or connects it therewith and which is embodied as a plate valve that projects upon opening into the working chamber, energy is withdrawn from a flow from the working chamber into the flow channel, resulting form the excess pressure within the working chamber upon opening movement of the valve. The withdrawn energy is used for aiding in further opening of the valve.

1 Claim, 2 Drawing Sheets

METHOD AND DEVICE FOR OPENING A VALVE, ESPECIALLY A LOAD CHANGING VALVE OF AN INTERNAL COMBUSTION ENGINE

BACKGROUND OF THE INVENTION

The invention relates to a method and device for opening a valve, especially a load changing valve of an internal combustion engine.

From German patent 30 24 109 C2 a device, operating without camshaft, for actuating a load changing of an internal combustion engine is known. To the stem of the load changing valve an armature plate is fastened which in the fully open position of the valve contacts the solenoid and in the closed position of the valve contacts another solenoid. The armature plate forms together with the valve and two oppositely acting springs an oscillation system which upon activation of one solenoid is secured in one end position, whereby, upon switching off the solenoid, the armature plate moves toward the other end position and is secured thereat by activation of the other solenoid.

Such electromagnetic actuating devices, operating without camshaft, for the load changing valves of an internal combustion engine have the advantage that the control time can be selected substantially freely so that fuel consumption advantages can be achieved and the exhaust gas quality can be improved. A problem of such actuating devices is that the opening of the valve by pressure within the working chamber or combustion chamber is greatly impaired. For example, an exhaust valve must be opened already in certain operational phases when within the combustion chamber there is still a high working pressure. This high working pressure must be overcome by a spring which crowds the valve in the opening direction so that energy is removed from the oscillating system defined by the springs which energy must be then supplied by the solenoid. The solenoid which secures the valve in the fully open position must therefore be designed relatively large so that catching of the valve is possible. In the alternative, the springs must be so strong that high securing forces and thus large solenoids are required.

It is an object of the invention to provide a method and a device for opening a valve, especially a load changing valve of an internal combustion engine, with which a load changing valve can be opened safely and with minimal energy expenditure even when it must be opened counter to the excess pressure within the working chamber.

SUMMARY OF THE INVENTION

The inventive method is deigned for opening a valve, especially a load changing valve of an internal combustion engine, that separates a flow channel from a working chamber or connects it therewith and is embodied as a plate valve. Upon opening, the valve projects into the working chamber. According to the inventive method, energy is withdrawn from a flow out of the working chamber into a flow channel, resulting from excess pressure within the working chamber upon beginning of the opening stroke of the valve, and this energy is used for supporting the further opening movement of the valve.

The inventive device is designed for opening a valve, especially a load change valve of an internal combustion engine, that separates a flow channel from a working chamber or connects it therewith and is embodied as a plate valve. Upon opening, the valve projects into the working chamber. The inventive device comprises a flow guide element connected to the valve and surrounding the valve at a spacing. The flow guide element projects from the backside of the valve seat ring through the flow channel into a blind bore extending away from the flow channel, whereby the circumferential edge at the valve side of the flow guide element for a small valve opening receives a portion of the initial flow from the working chamber into the flow channel and guides it into the space between the valve and the flow guide element. The circumferential edge of the flow guide element at the blind bore side and the circumferential wall of the blind bore are designed such that at least during a portion of the valve stroke a reduced a flow cross-section is provided between them.

In another embodiment of the inventive device, an auxiliary piston component having a tubular shaft, which surrounds the valve stem and is moveably guided coaxially to the valve stem in the cylinder head, is provided. This auxiliary component comprises an auxiliary piston, which cooperates with its circumferential edge with a cylindrical area of the opening of the flow channel into the working chamber, whereby the inner diameter of the cylindrical area corresponds substantially to the outer diameter of the auxiliary piston. An actuating device moves the auxiliary piston substantially in counter phase to the valve so that the auxiliary piston opens the flow channel for a small opening movement of the valve only partially and only opens it completely upon greater valve opening movement.

Inventively, the flow out of the working chamber into the flow channel, resulting from excess pressure present within the working chamber during the initial opening phase of the valve, is used to extract energy therefrom which energy is used for supporting (enhancing or aiding in) the opening action of the valve. In this manner, the energy required for opening the valve against the excess pressure in the working chamber is reduced.

The invention is not only useful for electromagnetically operated load changing valves of internal combustion engines. They are also useful for conventionally actuated load changing valves because the invention lowers the actuating energy. The invention is also suitable for use with valves of pumps or other control members which must open against an excess pressure.

BRIEF DESCRIPTION OF THE DRAWINGS

The object and advantages of the present invention will appear more clearly from the following specification in conjunction with accompanying drawings, in which.

DESCRIPTION OF THE PREFERRED EMBODIMENTS

The present invention will now be described in detail with the aid of several specific embodiments utilizing FIGS. 1–4.

Figure 1:
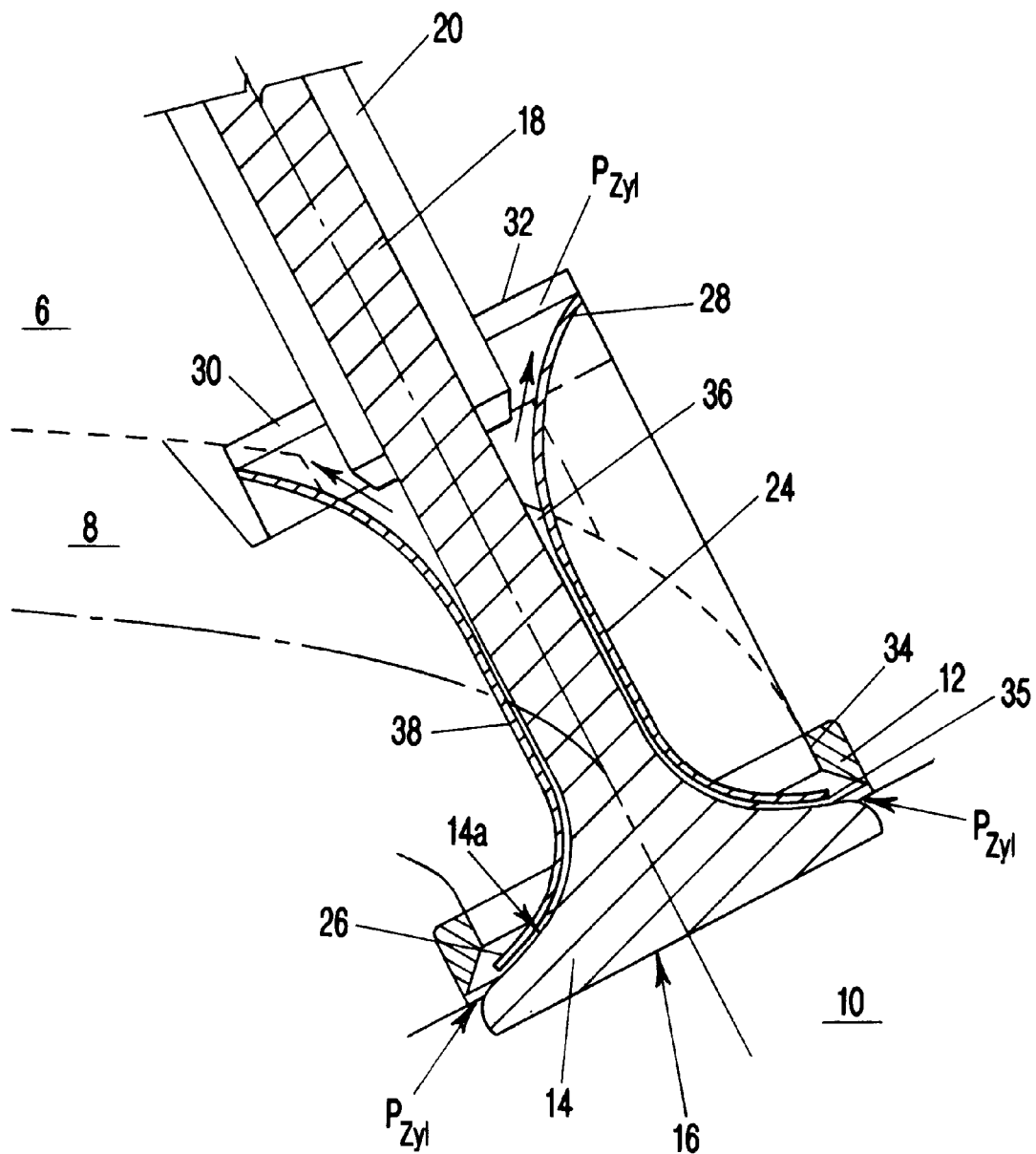
FIG. 1 shows a cross-section of a portion of a valve mounted within the cylinder head of an internal combustion engine and having a flow guide element.

FIG. 1 shows a cross-section of a portion of a cylinder head 6 which has an outlet channel or flow channel 8 which extends away from the combustion chamber or the working chamber 10.

At the opening of the outlet channel 8 into the working chamber 10 a valve seat ring 12 is arranged which cooperates with the valve plate 14 of a valve 16. The valve stem 18 penetrates the outlet channel 8 and is guided in a guide bushing 20 within the cylinder head 6. Between the cylinder head 6 and the stem 18 a non-represented valve closing spring is arranged.

The aforementioned arrangement with regard to the design and function is known to a person skilled in the art and is therefore not disclosed in further detail. The actuating device for the valve 16 can be embodied conventionally by a camshaft, push rods, rocker arms etc. or performed hydraulically electromagnetically, or pneumatically.

Inventively, a flow guide element 24 is provided that surrounds the valve 16 such that a flow space is created. The flow guide element 24, adjacent to the valve seat ring 12 or the backside 14a of the valve plate 14, ends in a circumferential edge 26 and, adjacent to the cylinder head 6, ends in a circumferential edge 28.

The cylinder head 6 is embodied with a blind bore 30 which extends concentrically to the valve shaft 18. The circumferential edge 28 of the flow guide element 24 projects into the blind bore 30.

The depth of the blind bore 30 is such that the circumferential edge 28 of the flow guide element 24 in the closed state of the valve 16 is positioned in the vicinity of the bottom 32 of the blind bore 30. The outer diameter of the circumferential edge 28 corresponds essentially to the inner diameter of the blind bore 30 or is somewhat smaller so that the circumferential edge 28 cooperates with the inner side of the blind bore in the manner of a gap seal.

The circumferential edge 26 at the valve plate side of the flow guide element 24 is embodied such that it forms with the backside of the valve plate 14 an annular gap 35 which receives, upon opening of the valve 16, the flow exiting from the working chamber in the manner of an opening of a Pitot tube for measuring the flow pressure. In the represented embodiment the circumferential edge 26 in the closed state of the valve 16 projects into a cylindrical portion 34 of the valve seat ring 12 or the opening of the outlet channel 8, whereby the inner diameter of the cylindrical area 34 corresponds to the outer diameter of the circumferential edge 26.

The flow guide element 24 is embodied such that between it and the outer circumference of the valve 16 a flow passage 36 is provided whereby the spacing between the flow guide element 24 and the valve 16 in the most narrow portion of the flow passage is, for example, within a magnitude of 0.5 mm.

The flow guide element 24 can be a shaped sheet metal piece comprised of a highly temperature-resistant sheet metal and can be welded to the valve 16, for example, by individual spot welds 38.

The function of the flow guide element 24 is as follows:

It is assumed that the valve 16 is in its closed position and that in the working chamber a pressure $P_{zyl}$ is present which is greater than the pressure in the outlet channel 8. When the valve 16 is only slightly open, a large portion of the flow-cross section, formed between a conical surface of the valve plate 14 and the conical surface of the valve seat ring 12, is filled by the annular gap 35 between the circumferential edge 26 and the backside of the valve plate 14 so that the flow resulting from the excess pressure within the working chamber 10 is received by the annular gap 35 and is guided into the flow passage 36 between the flow guide element 24 and the valve 16. This has the effect that in the blind bore 30 within a short amount of time substantially the same pressure $P_{zyl}$ is present. With a corresponding embodiment of the annular gap 35 in the manner of an inlet opening of a Pitot tube, the annular gap 35, for further opening of the valve, will receive the entire pressure of the flow and will guide it into the blind bore. A reduced outflow cross-section from the blind bore 30, when the circumferential edge 28 cooperates advantageously with the inner side of the blind bore 30 in the manner of a gap seal (frictional freedom), is without substantial impact on the pressure conditions within the blind bore 30.

The pressure increase Δp effects at the valve 16 an additional opening force Δp×F, whereby F is the effective surface, i.e., the surface limited by the circumferential edge 28 minus the cross-sectional surface of the stem 18. Depending on the diameter of the circumferential edge 28, an additional force of greater or smaller magnitude can be produced which compensates the excess pressure in the working chamber or maybe even overcompensate this pressure. This additional force becomes active and is maintained as long as in the working chamber a pressure $P_{zyl}$ is present which is greater than the pressure in the outlet channel 8. In this manner, the flow energy from the working chamber is used for improving the opening action of the valves 16.

The embodiment can be such that upon further opening of the valve 16 the circumferential edge 26 will increasingly free the outlet cross-section into the outlet channel 8 whereby the circumferential edge 28 first keeps the blind bore 30 closed and, only upon further valve stroke, will exit from the blind bore 30.

As can be taken from the above, the flow guide element 24 provides a device which reduces the energy required for opening the valve 16 counter to an excess pressure within the working chamber 10 by guiding the excess pressure to the backside of the valve 16 in order to create a force in the opening direction. The flow guide element 24 not only employs static pressure but also employs the flow energy.

Figure 2:
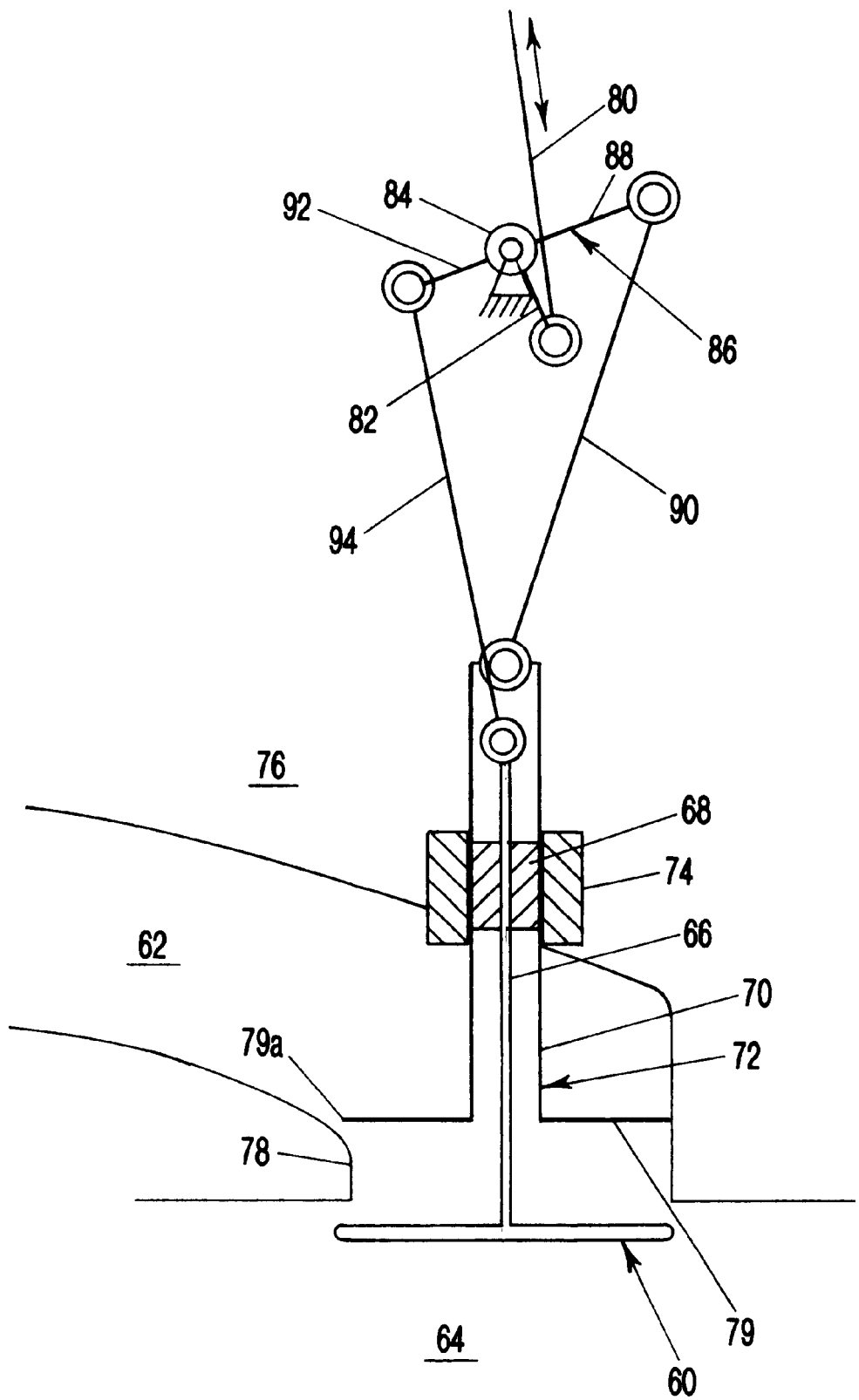
FIG. 2 shows a basic schematic of a further embodiment of the inventive device.

FIG. 2 shows schematically a changed embodiment of a device for enhancing the opening movement of the valve which functions primarily by employing static pressure.

The valve 60 operates in the outlet opening of an outlet channel 62 of a combustion chamber or working chamber 64.

The stem 66 of the valve 60 is guided in a guide bushing 68 which is received in a tubular shaft 70 of an auxiliary piston component 72. The tubular shaft 70 is guided by a further guide bushing 74 in the cylinder head 76.

The opening of the outlet channel 62 into the working chamber 64 is embodied with a cylindrical area 78 having an inner diameter which matches substantially the outer diameter of the auxiliary piston 79 which is a part of the auxiliary piston component 72.

In the shown embodiment, for actuating the valve 60 a crank mechanism with a reciprocating actuating lever 80 is provided that is driven by a non-represented device. The actuating lever 80 engages a crank 82 of a shaft 84 connected to the engine. The shaft 84 has connected thereto a two-arm lever 86. One arm 88 is connected by lever 90 to the tubular shaft 70 of the auxiliary piston component 72, and the other arm 92 is connected by a lever 94 to the valve stem 66.

The arrangement is such that, in the closed state of the valve 60 (lever 86 according to FIG. 2 rotated in the clockwise direction to a substantially horizontal position), the auxiliary piston 79 with its circumferential edge 79a is moved into this cylindrical area 78 and is positioned in the vicinity of the end of the cylindrical area 78 that is close to the working chamber directly behind the valve 60.

When the valve 60 is now opened by pivoting of the lever 86 in a counter clockwise direction, the auxiliary piston component 72 is moved counter to the movement of the valve 60 whereby the auxiliary piston 79 remains initially within the cylindrical area 78 and closes the inlet into the outlet channel 62 substantially completely so that the auxiliary piston is loaded with the excess pressure present within the working chamber 64 and is thus forced upwardly and supports the opening movement of the valve 60 via the levers 90, 86, and 94. Only upon further opening of the valve 60, respectively, pivoting of the lever 86, the circumferential edge 79a of the auxiliary piston 79 is released from the cylindrical area 78 so that the flow into the outlet channel 62 is possible.

It is understood that the cylindrical area 78 with respect to its depth and with respect to its design details (transition into a substantially partially conical area) are designed according to desired specifications.

In the device according to FIG. 2, the excess pressure in the working chamber, respectively, its release to the backside of the valve plate at the beginning of the opening stroke of the valve, is used in order to reduce the energy for opening the valve.

The specification incorporates by reference the disclosure of German priority document 198 35 403.7 of Aug. 5, 1998.

The present invention is, of course, in no way restricted to the specific disclosure of the specification and drawings, but also encompasses any modifications within the scope of the appended claims.

What is claimed is:

1. A method for opening a single plate valve (16, 60), separating a flow channel (8, 62) from a working chamber (10, 64) or connecting the flow channel (8, 62) with the working chamber (10, 64), wherein the valve in an open position projects into the working chamber (10, 64), said method comprising the steps of:

directly withdrawing energy from a flow flowing out of the working chamber (10, 64) into a flow channel (8, 62) as soon as said plate valve begins to open, said flow resulting from excess pressure within the working chamber (10, 64), wherein said plate valve effectively opens a passage between the working chamber (10, 64) and the flow channel (8, 62) remains completely open;

using the withdrawn energy for supporting further opening movement of the valve (16, 60).

* * * * *